United States Patent [19]

Nishikawa

[11] 4,237,417
[45] Dec. 2, 1980

[54] SIGNAL TRANSMISSION APPARATUS OF TWO-WIRE TYPE

[75] Inventor: Akikazu Nishikawa, Kiyose, Japan

[73] Assignee: Kenki Kagaku Keiki Co., Ltd., Tokyo, Japan

[21] Appl. No.: 963,760

[22] Filed: Nov. 27, 1978

[30] Foreign Application Priority Data

Apr. 18, 1978 [JP] Japan .................... 53/45602

[51] Int. Cl.³ ............................................ G01R 27/02
[52] U.S. Cl. ..................................... 324/118; 324/62; 324/438
[58] Field of Search ................ 324/118, 62, DIG. 1, 324/438, 439

[56] References Cited

U.S. PATENT DOCUMENTS

| | | | |
|---|---|---|---|
| 3,246,309 | 4/1966 | Gasch, Jr. | 324/438 X |
| 3,503,261 | 3/1970 | Riester et al. | 324/DIG. 1 |
| 3,517,556 | 6/1970 | Barker | 324/DIG. 1 |
| 3,538,355 | 11/1970 | Grindheim et al. | 324/DIG. 1 |
| 3,562,729 | 2/1971 | Hurd | 324/DIG. 1 |
| 3,675,122 | 7/1972 | Rose | 324/62 |
| 3,680,384 | 8/1972 | Grindheim | 324/DIG. 1 |
| 3,859,594 | 1/1975 | Grindheim | 324/62 X |
| 3,867,694 | 2/1975 | Goltermann | 324/118 X |

Primary Examiner—Stanley T. Krawczewicz

Attorney, Agent, or Firm—Stevens, Davis, Miller & Mosher

[57] ABSTRACT

An improved signal transmission apparatus of two-wire type is disclosed. The transmitting circuit of the improved apparatus comprising a voltage-frequency converter to convert a DC input signal into an AC signal having a frequency proportional to the magnitude of the DC input signal, an AC amplifier circuit coupled to the output of said converter through a first insulating transformer to amplify the AC output signal of the converter, a frequency-voltage converter to convert the amplified AC output signal of the AC amplifier circuit into a DC voltage signal having a magnitude proportional to the frequency of the AC signal, a voltage-current converter circuit to change the magnitude of a direct current supplied from the DC power source in the receiving circuit to the transmitting circuit through a two-wire transmission line in response to the change in the magnitude of said DC voltage signal, and a rectifier circuit coupled to the output of said AC amplifier circuit through a second insulating transformer to rectify a portion of the amplified AC output of the AC amplifier circuit and to supply operating DC power to said voltage-frequency converter independently of the DC power source in the receiving circuit.

2 Claims, 1 Drawing Figure

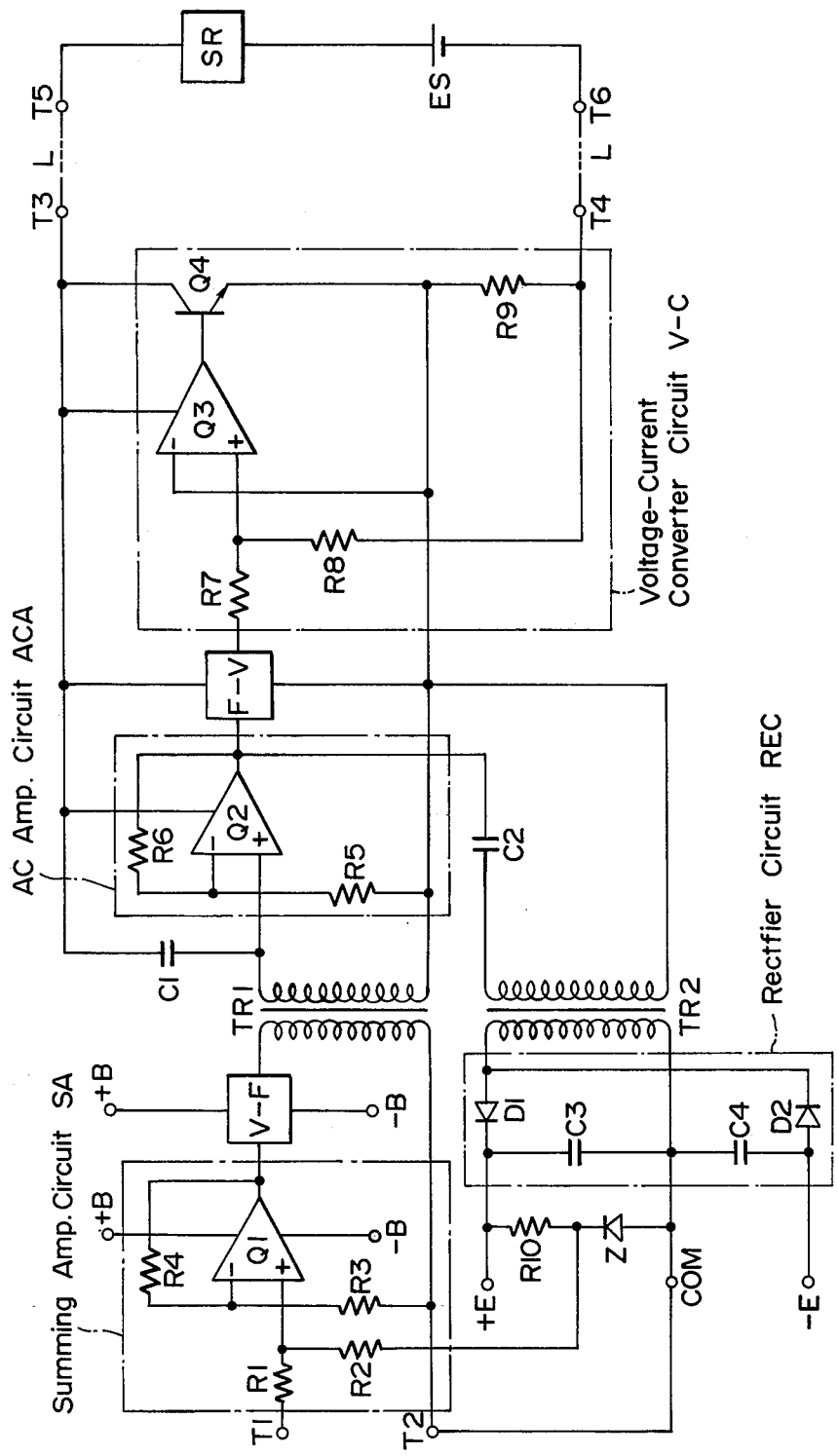

SIGNAL TRANSMISSION APPARATUS OF TWO-WIRE TYPE

BACKGROUND OF THE INVENTION

This invention relates generally to a signal transmission apparatus of two-wire type, and more particularly to a signal transmission apparatus of two-wire type suitable for transmitting an output signal of a detector, such as for example a pH meter, a detector of the concentration of dissolved oxygen in a liquid, and the like, for the purpose of remote measurement.

In the case of transmitting an output signal of a detector, such as a pH meter, a detector of the concentration of dissolved oxygen in a liquid and the like, arranged in a place of detection (the transmitting side) to a indicating or recording device arranged in a place of indication or recording (the receiving side) remote from the place of detection it has been a common practice hitherto to use a signal transmission apparatus of four-wire type in which a transmitting circuit arranged in the place of detection and a receiving circuit arranged in the place of indication or recording is connected by four-wire transmission line and two wires of the transmission line are used to supply operating power of the transmitting circuit from the receiving circuit and remaining two wires are used to transmit the output signal of the transmitting circuit to the receiving circuit.

However, the signal transmission apparatus of four-wire type which has been used hitherto has the following detects or disadvantages:

One defect or disadvantage is the fact that it is very difficult to obtain stable operation of the transmitting and receiving circuits, because the input side and the output side of the transmitting circuit are not insulated for DC voltage and it is impossible to ground the transmitting circuit and the receiving circuit independently.

Another defect or advantage is the fact that the construction of a four-line transmission line is unavoidably complicated.

OBJECT AND SUMMARY OF THE INVENTION

An object of this invention is to provide a signal transmission apparatus of two-wire type, wherein the transmitting circuit and the receiving circuit are connected by a two-wire transmission line of simple construction which is used both as a transmission line of an output signal of the transmitting circuit and a supply line of operating power of the transmitting circuit, and the transmitting circuit is constructed to have a relatively simple construction and also the input side and the output side thereof are insulated for a DC voltage so that the transmitting circuit and the receiving circuit can be grounded independently in order to operate both the transmitting and receiving circuit stably.

According to the present invention, there is provided a signal transmission apparatus of two-wire type comprising a transmitting circuit which receive a DC input signal and generate an output signal which represents the magnitude of the input signal, a receiving circuit including a device for indicating or recording the output signal sent from the transmitting circuit and a DC power source connected in series with said device, and a two-wire transmission line connecting the transmitting circuit and the receiving circuit to transmit the output signal from the transmitting circuit to the receiving circuit and also to supply energizing DC power from the receiving circuit to the transmitting circuit, wherein the transmitting circuit comprises a voltage-frequency converter which converts a DC input signal voltage to an alternating current having a frequency proportional to the magnitude of the input signal voltage; an AC amplifier circuit coupled to the output of said voltage-frequency converter through a first insulating transformer to amplify the AC output of the voltage-frequency converter; a frequency-voltage converter coupled to the output of said AC amplifier circuit to generate a DC voltage having a magnitude proportional to the frequency of the amplified AC output of the AC amplifier circuit; a voltage-current converter circuit coupled to the output of said frequency-voltage converter to change the magnitude of a direct current transmitted from the receiving circuit to the transmitting circuit through said two-wire transmission line, in response to the changes in the DC output voltage of said frequency-voltage converter; and a rectifier circuit coupled to the output of said AC amplifier circuit through a second insulating transformer to rectify a portion of the amplified AC output of the AC amplifier circuit and to supply operating DC power to said voltage-frequency converter.

The transmitting circuit of the signal transmission apparatus of this invention may be constructed to comprise additionally a summing amplifier circuit having an input of a DC voltage being detected or measured and an input of a DC voltage which has an adjustable predetermined value, the output voltage of said summing amplifier circuit is supplied to the voltage-frequency converter as a DC input signal, and the rectifier circuit coupled the output of the AC amplifier circuit through a second insulating transformer supplies operating DC power to said summing amplifier circuit and voltage-frequency converter and also provides said summing amplifier circuit a DC input voltage of adjustable predetermined value.

BRIEF DESCRIPTION OF THE DRAWING

A single FIGURE of the drawing is the schematic connection diagram showing an embodiment of the signal transmission apparatus according to this invention.

DESCRIPTION OF THE PREFERRED EMBODIMENT

A full understanding of this invention and some specific application thereof may be had from the following description with reference to the accompanying drawing which showing the connection diagram of a preferred embodiment of this invention.

The signal transmission apparatus of two-wire type shown in the drawing comprises a transmitting circuit including a summing amplifier circuit SA, a voltage-frequency converter V-F, an AC amplifier circuit ACA, a frequency-voltage converter F-V, a voltage-current converter circuit V-C and a rectifier circuit REC; a receiving circuit including a signal receiver SR, such as for example an indicating meter or a recording meter, and a DC power source ES connected in series with said signal receiver; and a two-wire transmission line L.

The summing amplifier circuit SA consists of an operational amplifier $Q_1$ and operational resistors, $R_1$, $R_2$, $R_3$, $R_4$, and has signal input terminals $T_1$ and $T_2$ connected to the positive and negative inputs of the amplifier $Q_1$ respectively through the resistor $R_1$, and a DC voltage such as an output signal voltage of a detector such as for example a pH meter is supplied across the input terminals $T_1$ and $T_2$. In the case of the detector is a detector of the concentration of dissolved oxygen which generate an output signal current, a signal voltage which was obtained by converting said output signal current is supplied across the input terminals $T_1$ and $T_2$.

The voltage-frequency converter V-F may be of conventional construction, and being coupled to the output of the summing amplifier SA to convert the DC output voltage of the summing amplifier circuit into an alternating current having a frequency corresponding to the magnitude of the DC output voltage.

The AC amplifier circuit ACA consists of an operational amplifier $Q_2$ and operational resistors $R_5$, $R_6$, and being coupled to the output of the voltage-frequency converter V-F through a first insulating transformer $TR_1$ to amplify the AC output of said converter.

The frequency-voltage converter F-V may be of conventional construction, and being coupled to the output of the AC amplifier circuit ACA to convert the amplified AC output of the AC amplifier circuit into a DC voltage having a magnitude corresponding to the frequency of the amplified AC output.

The voltage-current converter circuit V-C consists of an operational amplifier $Q_3$, operational resistors $R_7$, $R_8$, a transistor $Q_4$ and a feedback resistor $R_9$, and being coupled to the output of the frequency-voltage converter F-V. The voltage-current converter circuit V-C performs a function to change the magnitude of a current flowing through its output circuit in response to the changes in the DC voltage applied to its input terminal.

The rectifier circuit REC consists of a pair of rectifying elements, such as diodes $D_1$ and $D_2$ or the like, and smoothing capacitors $C_3$, $C_4$, and being coupled to the output of the AC amplifier circuit ACA through a coupling capacitor $C_2$ and a second insulating transformer $TR_2$ to rectify a portion of the AC output of said amplifier circuit and to induce a DC voltage across the positive output terminal $+E$ and the negative output terminal $-E$ thereof.

The junction point of a resistor $R_{10}$ and a zener diode Z connected in series between the positive output terminal $+E$ and the common output terminal COM of the rectifier circuit is connected to the positive input of the operational amplifier $Q_1$, and the common output terminal COM is connected through the operational resistor $R_3$ to the negative input of the amplifier $Q_1$, so that the DC voltage of a constant value across the zener diode Z is supplied to the amplifier $Q_1$ as an additional DC input voltage.

The positive and negative output terminals $+E$ and $-E$ of the rectifier circuit REC are connected respectively to the positive and negative B terminals $+B$ and $-B$ of the operational amplifier $Q_1$ and the voltage-frequency converter V-F to energize the amplifier $Q_1$ and the converter V-F by the DC output voltage of the rectifier circuit.

The output terminals $T_3$ and $T_4$ of the transmitting circuit, across which the output circuit of the voltage-current converter circuit V-C including the transistor $Q_4$ and the feedback resistor $R_9$ in series is connected, are connected through the two-wire transmission line L to the input terminals $T_5$ and $T_6$ of the receiving circuit, across which the signal receiver SR and the DC power source ES are connected in series. The positive B terminals of the operational amplifiers $Q_2$, $Q_3$ and the frequency-voltage converter F-V are connected respectively to the terminal $T_3$, and the terminal $T_3$ is also connected to the positive input terminal of the amplifier $Q_2$ through a coupling capacitor $C_1$.

In the operation of the signal transmission apparatus shown in the drawing, a DC operating voltage is applied from the DC power source ES to the operational amplifiers $Q_2$, $Q_3$, the frequency-voltage converter F-V and the transistor $Q_4$ of the transmitting circuit through the two-wire transmission line L, by closing a power switch (not shown) suitably arranged in the receiving circuit. At the same time, a pulse voltage induces by the closing of the power switch is supplied through the coupling capacitor $C_1$ to the positive input of the amplifier $Q_2$ to start the operation of the amplifier $Q_2$, and a pulse voltage appearing on the output of the amplifier $Q_2$ is supplied through the coupling capacitor $C_2$ and the transformer $TR_2$ to the input of the rectifier circuit REC, and consequently a DC voltage appears across the output terminals $+E$ and $-E$ of the rectifier circuit.

Thus, the operational amplifier $Q_1$ and the voltage-frequency converter V-F are energized by a DC voltage appeared on the output terminals $+E$ and $-E$ of the rectifier circuit REC, and a DC voltage appearing across the zener diode Z is supplied to the input of the amplifier $Q_1$ to start the operation of the amplifier $Q_1$. The DC voltage appeared on the output of the amplifier $Q_1$ is converted by the converter V-F into an alternating current and supplied to the input of the rectifier circuit REC through the AC amplifier circuit ACA, the capacitor $C_2$ and the transformer $TR_2$, so that the rectifier circuit can generate, after a several cyclical repeat of above mentioned operation, a DC voltage of a magnitude sufficient to operate continuously the amplifier $Q_1$ and the converter V-F in a steady state.

After the amplifier $Q_1$ and the converter V-F reached in a state of steady operation, a DC input signal voltage from a detector such as a pH meter or the like is supplied to the input terminals $T_1$ and $T_2$, and the DC output voltage of the amplifier $Q_1$ having a magnitude corresponds to sum of the value of the input signal voltage and the value of a constant DC voltage provided by the zener diode Z is supplied to the converter V-F and is converted into an alternating current of a frequency proportional to the magnitude of the output voltage of the amplifier $Q_1$.

The alternating current generated by the converter V-F is supplied to the operational amplifier $Q_2$ through the transformer $TR_1$, and is amplified. The amplified AC output of the amplifier $Q_2$ is supplied to the frequency-voltage converter F-V and is converted into a DC voltage having a magnitude proportional to the frequency of the AC output of the amplifier $Q_2$.

The DC output voltage of the converter F-V is amplified by the operational amplifier $Q_3$ and then is supplied to the base of the transistor $Q_4$ to change the current flowing through the collector-emitter circuit of the transistor $Q_4$ in response to the changes in the magnitude of the DC output voltage of the amplifier.

Therefore, the direct current supplied from the receiving circuit to the transmitting circuit through the two-wire transmission line L is changed in response to the changes in the DC output voltage, which correspond to the change in the DC input signal voltage applied to the input terminals $T_1$ and $T_2$ of the summing amplifier circuit SA, and thus the magnitude of the DC input signal voltage is indicated or recorded by the signal receiver SR arranged in the receiving circuit.

The voltage drop produced in the feedback resistor $R_9$ connected in series in the collector-emitter circuit of the transistor $Q_4$ is negatively fed back to the positive input of the amplifier $Q_3$ through the resistor $R_8$, and it is possible to attain a very stable voltage-current converting operation of the converter circuit V-C.

In the case of the DC input signal voltage supplied to the input terminals $T_1$ and $T_2$ of the summing amplifier circuit SA is of a negative value, it is possible to produce by the converter V-F an alternating current having a frequency correspond to the input signal voltage by selecting the value of the DC voltage provided by the zener diode Z for a suitable value.

A portion of the amplified AC output of the operational amplifier $Q_2$ is supplied through the coupling capacitor $C_2$ and the transformer $TR_2$ to the input of the rectifier circuit REC, and a DC voltage of a magnitude sufficient to keep the amplifier $Q_1$ and the converter V-F in their steady operating state and to provide by the zener diode a constant DC input voltage to the amplifier $Q_1$ can be obtained on the output terminals $+E$ and $-E$ of the rectifier circuit REC, and thus it is possible to operate the amplifier $Q_1$ and the converter V-F continuously without feeding to these elements a DC operating power directly from the DC power source ES in the receiving circuit through the two-wire transmission line L.

Although there is shown in the drawing a summing amplifier circuit SA consists of an operational amplifier $Q_1$ and four operational resistors $R_1$–$R_4$, and an AC amplifier circuit ACA consists of an operational amplifier $Q_2$ and two operational resistor $R_5$, $R_6$, it will be appreciated that any summing amplifier circuit and AC amplifier circuit of the conventional constructions may be used respectively in place of said amplifier circuits SA and ACA.

It will also be appreciated that any of well known full wave rectifier circuits of the conventional constructions or a conventional voltage doubling half wave rectifier circuit may be used in place of the voltage doubling full wave rectifier circuit REC shown in the drawing.

As will be easily understood from the foregoing description, the signal transmission apparatus of this invention has advantageous effects, as compared with the signal transmission apparatus which has been hitherto commonly used, in the points that (1) the construction of the transmission line has been simplified because a two-wire transmission line is used to transmit both signals and operating DC power, (2) the construction of the transmitting circuit has been simplified because the transmitting circuit is constructed by a small number of circuit elements which have conventional construction and are available in the market, and (3) it is possible to use the apparatus for transmitting a detected DC signal in the remote detection or measurement of pH value of a liquid or the concentration of dissolved oxygen in a liquid without affecting the operation of the detector, even if a detector such as a pH meter or the like which as detection electrode on of which being grounded through a liquid to be detected is connected between the signal input terminals $T_1$ and $T_2$ of the transmitting circuit, because the signal input terminals $T_1$ and $T_2$ are insulated DC voltage by the insulating transformers $TR_1$ and $TR_2$ from the DC power source ES connected to the output terminals $T_3$ and $T_4$ through the two-wire transmission line.

Thus, the signal transmission apparatus of two-wire type is suitable to use for transmitting a detected DC signal in the remote detection or measurement of the value of a liquid, the concentration of dissolved oxygen in a liquid and so forth.

It will be understood that foregoing description of a specific embodiment of this invention is made by way of example only and is not to be regarded as a limitation on the scope of this invention. Therefore many changes or modifications may be made within the scope and spirit of this invention, which is defined in the appended claims.

What is claimed is:

1. A signal transmission apparatus of two-wire type, comprising a transmitting circuit which receives a DC voltage to be detected or to be measured as an input signal and generates an output signal which represents the magnitude of the input signal, a receiving circuit including a device for indicating or recording the magnitude of the output signal sent from the transmitting circuit and a DC power source connected in series with said device, and a two-wire transmission line connecting the transmitting circuit and the receiving circuit to transmit the output signal from the transmitting circuit to the receiving circuit and also to transmit energizing DC power from the receiving circuit to the transmitting circuit, characterized in that said transmitting circuit comprises a voltage-frequency converter which is supplied with a DC input signal voltage and generates an alternating current having a frequency proportional to the magnitude of the input signal voltage; an AC amplifier circuit coupled to the output of said voltage-frequency converter through a first insulating transformer to amplify the AC output of the voltage-frequency converter; a frequency-voltage converter coupled to the output of said AC amplifier circuit to generate a DC voltage having a magnitude proportional to the frequency of the amplified AC output of the AC amplifier circuit; a voltage-current converter circuit coupled to the output of said frequency-voltage converter, and changes the magnitude of a direct current transmitted from the receiving circuit to the transmitting circuit through said two-wire transmission line, in response to the changes in the DC output voltage of said frequency-voltage converter; and a rectifier circuit having at least a pair of rectifying elements and being coupled to the output of said AC amplifier circuit through a second insulating transformer to rectify a portion of the amplified AC output of the AC amplifier circuit and to supply operating DC power to said voltage-frequency converter.

2. A signal transmission apparatus of two-wire type described in claim 1, in which said transmitting circuit further comprises a summing amplifier circuit having an input of DC voltage being detected or measured and an input of DC voltage which has an adjustable predetermined value, the output voltage of said summing amplifier circuit is supplied to said voltage-frequency converter as a DC input signal voltage, and said rectifier circuit supplys operating DC power to said summing amplifier circuit and voltage-frequency converter and provides said summing amplifier circuit a DC input voltage of adjustable predetermined value.

* * * * *

UNITED STATES PATENT AND TRADEMARK OFFICE
CERTIFICATE OF CORRECTION

PATENT NO. : 4,237,417
DATED : December 2, 1980
INVENTOR(S) : Akikazu NISHIKAWA

It is certified that error appears in the above-identified patent and that said Letters Patent are hereby corrected as shown below:

Item [73] Assignee should read

--Denki Kagaku Keiki Co., Ltd., Tokyo, Japan--.

Signed and Sealed this

Twelfth Day of May 1981

[SEAL]

*Attest:*

RENE D. TEGTMEYER

*Attesting Officer*  *Acting Commissioner of Patents and Trademarks*